United States Patent
Pedersen et al.

(10) Patent No.: US 11,540,063 B2
(45) Date of Patent: Dec. 27, 2022

(54) HEARING DEVICE COMPRISING A DETECTOR AND A TRAINED NEURAL NETWORK

(71) Applicant: Oticon A/S, Smørum (DK)

(72) Inventors: Michael Syskind Pedersen, Smørum (DK); Asger Heidemann Andersen, Smørum (DK); Jesper Jensen, Smørum (DK); Nels Hede Rohde, Smørum (DK); Anders Brødløs Olsen, Smørum (DK); Michael Smed Kristensen, Ballerup (DK); Thomas Bentsen, Smørum (DK); Svend Oscar Petersen, Smørum (DK)

(73) Assignee: Oticon A/S, Smørum (DK)

( * ) Notice: Subject to any disclaimer, the term of this patent is extended or adjusted under 35 U.S.C. 154(b) by 104 days.

(21) Appl. No.: 17/060,732

(22) Filed: Oct. 1, 2020

(65) Prior Publication Data
US 2021/0105565 A1 Apr. 8, 2021

(30) Foreign Application Priority Data
Oct. 8, 2019 (EP) ..................................... 19202002

(51) Int. Cl.
*H04R 25/00* (2006.01)
*G06N 3/063* (2006.01)
(Continued)

(52) U.S. Cl.
CPC .......... *H04R 25/507* (2013.01); *G06N 3/063* (2013.01); *G10L 15/08* (2013.01); *G10L 17/00* (2013.01);
(Continued)

(58) Field of Classification Search
CPC ........................... H04R 25/507; H04R 25/554; H04R 2225/67; H04R 25/70; H04R 25/453;
(Continued)

(56) References Cited

U.S. PATENT DOCUMENTS 6,035,050 A * 3/2000 Weinfurtner ......... H04R 25/507
381/313
2015/0016647 A1 * 1/2015 Segovia Martinez ......................
A61N 1/36038
381/317

(Continued)

FOREIGN PATENT DOCUMENTS

CN 104287872 A * 1/2015 ............. A61N 1/025
EP 0 574 951 A2 12/1993
(Continued)

*Primary Examiner* — Akelaw Teshale
(74) *Attorney, Agent, or Firm* — Birch, Stewart, Kolasch & Birch, LLP

(57) ABSTRACT

A hearing device comprises an input transducer comprising a microphone for providing an electric input signal representative of sound in the environment of the hearing device, a pre-processor for processing electric input signal and providing a multitude of feature vectors, each being representative of a time segment thereof, a neural network processor adapted to implement a neural network for implementing a detector configured to provide an output indicative of a characteristic property of the at least one electric input signal, the neural network being configured to receive said multitude of feature vectors as input vectors and to provide corresponding output vectors representative of said output of said detector in dependence of said input vectors. The hearing device further comprises a transceiver comprising a transmitter and a receiver for establishing a communication link to another part or device or server, at least in a particular adaptation-mode of operation, and a selector for—in said particular adaptation-mode of operation—rout-
(Continued)

ing said feature vectors to said transmitter for transmission to said another part or device or server, and—in a normal mode of operation—to route said feature vectors to said neural network processor for use as inputs to said neural network, a neural network controller connected to said neural network processor for—in said particular adaptation-mode of operation—receiving optimized node parameters, and to apply said optimized node parameters to said nodes of said neural network to thereby implement an optimized neural network in said neural network processor, wherein the optimized node parameters have been selected among a multitude of sets of node parameters for respective candidate neural networks according to a predefined criterion in dependence of said feature vectors. A method of selecting optimized parameters for a neural network for use in a portable hearing device is further disclosed. The invention may e.g. be used in hearing aids or headsets, or similar, e.g. wearable, devices.

18 Claims, 9 Drawing Sheets

(51) Int. Cl.
*G10L 15/08* (2006.01)
*G10L 17/00* (2013.01)
(52) U.S. Cl.
CPC ...... *H04R 25/554* (2013.01); *G10L 2015/088* (2013.01); *H04R 2225/67* (2013.01)

(58) Field of Classification Search
CPC ........ H04R 25/558; H04R 25/30; H04R 1/10; H04R 2201/10; H04R 2225/41; G06N 3/063; G06N 3/0454; G06N 3/08; G10L 15/08; G10L 17/00; G10L 2015/088; G10L 15/16
See application file for complete search history.

(56) References Cited

U.S. PATENT DOCUMENTS

| | | | |
|---|---|---|---|
| 2015/0271607 A1* | 9/2015 | Sabin | H04R 25/30 381/314 |
| 2016/0360325 A1* | 12/2016 | Segovia Martinez | A61N 1/36038 |
| 2017/0128723 A1* | 5/2017 | Hamacher | A61N 1/36038 |
| 2020/0296521 A1* | 9/2020 | Wexler | H04R 25/405 |
| 2020/0336846 A1* | 10/2020 | Rohde | G10L 15/22 |
| 2021/0105565 A1* | 4/2021 | Pedersen | H04R 25/70 |
| 2022/0021985 A1* | 1/2022 | Wexler | G10L 25/51 |

FOREIGN PATENT DOCUMENTS

| | | | | |
|---|---|---|---|---|
| EP | 0 574 951 A3 | | 12/1993 | |
| EP | 0 814 634 A1 | | 12/1997 | |
| EP | 2823853 A1 | * | 1/2015 | ......... A61N 1/36036 |
| JP | 5254622 B2 | * | 8/2013 | ............... A61N 1/05 |
| WO | WO-2014108201 A1 | * | 7/2014 | ............ A61N 1/025 |
| WO | WO-2014114337 A1 | * | 7/2014 | ......... A61N 1/0541 |
| WO | WO-2016004970 A1 | * | 1/2016 | ........... A61N 1/0541 |

* cited by examiner

HEARING DEVICE COMPRISING A DETECTOR AND A TRAINED NEURAL NETWORK

SUMMARY

The present application deals with a hearing device, e.g. a hearing aid, comprising a detector, e.g. for detecting a certain acoustic environment, e.g. a voice detector, e.g. for detecting specific keywords for a voice control interface. The present application further deals with a scheme for personalization of hearing device parameters.

A Hearing Device:

In a first aspect of the present application, a hearing device configured to be located at or in an ear, or to be fully or partially implanted in the head, of a user, is provided. The hearing device comprises

- An input transducer comprising at least one microphone for providing at least one electric input signal representative of sound in the environment of the hearing device,
- A pre-processor for processing said at least one electric input signal and providing a feature vector (e.g. a multitude of feature vectors, each being e.g.) representative of a time segment of said at least one electric input signal,
- A neural network processor adapted to implement a neural network for implementing a detector, or a part thereof, e.g. configured to provide an output indicative of a characteristic property of the at least one electric input signal, the neural network comprising an input layer and an output layer and a number of hidden layers, each layer comprising a number of nodes, each node being defined by a number of node parameters, the neural network being configured to receive said feature vector (or said multitude of feature vectors) as an input vector (or as input vectors) and to provide an output vector (or corresponding output vectors) representative of an output of said detector or a part thereof, in dependence of said input vectors.

The hearing device may further comprise a signal post-processor configured to receive said output vector(s) and at least one input signal representing sound in the environment, and wherein said signal post-processor is configured to process said at least one input signal representing sound in dependence of said output vector(s) and to provide a processed output a resulting signal. The hearing device may further comprise a transceiver comprising a transmitter and a receiver for establishing a communication link to another part or device or server, said communication link allowing transmission and reception of data to and from, respectively, said another part or device or server, at least in a particular adaptation-mode of operation. The hearing device may further comprise a selector for—in said particular adaptation-mode of operation—routing said feature vectors to said transmitter for transmission to said another part or device or server, and—in a normal mode of operation—to route said feature vectors to said neural network processor for use as inputs to said neural network. The hearing device being configured to—in said particular adaptation-mode of operation—receive optimized node parameters from said another part or device or server, and to apply said optimized node parameters to said nodes of the neural network to thereby implement an optimized neural network in the neural network processor, wherein the optimized node parameters have been determined (e.g. selected among a multitude of sets of node parameters for respective candidate neural networks according to a predefined criterion) in dependence of said feature vectors.

'Another part' may e.g. be another part of the hearing device (e.g. integrated with or physically separate from, but in communication with). 'Another device' may e.g. be a separate (auxiliary) device, e.g. separate wearable device, e.g. a remote control device or a smartphone, etc. 'A server' may e.g. be a computer or storage medium located remotely from the hearing device, e.g. accessible via a network, e.g. via the Internet.

In a second aspect, the hearing device itself may comprise a number of pre-trained candidate neural networks so that the adaptation mode can be performed in the hearing device only, e.g. in that the adaptation mode runs during daily use of the hearing device. The hearing device may comprise a number of pre-trained candidate neural networks (from which an appropriate one, evaluated as performing best among the candidate neural networks for the user in question, is selected for use in the hearing device) so that the adaptation mode can be performed in the hearing device only (see e.g. FIG. 8). The hearing device may e.g. be configured to run adaptation mode during daily use of the hearing device.

Thereby an improve hearing may be provided.

The detector may e.g. be configured to identify characteristic properties of the at least one electric input signal. The 'characteristic properties' may e.g. relate to properties related to the nature of the sound that is currently being picked up by the at least one microphone and represented by the at least one electric input signal. The 'characteristic properties' may e.g. relate to acoustic properties of a current acoustic environment, The 'characteristic properties' may e.g. relate to speech and noise components, own voice and other voice, single-talker and multi-talker environment, speech and music, contents of a given speech sequence, etc.

The predefined criterion may relate to minimizing a cost function regarding said output vectors. The predefined criterion may be based on the performance of the neural network in terms of true positives, false positives, true rejections and false rejections of said output vectors, when said multitude of feature vectors are extracted from time segment of said at least one electric input signal having known properties.

The multitude of sets of node parameters for respective candidate neural networks may be optimized for different classes of persons exhibiting different acoustic properties.

The neural network processor may be specifically adapted to perform calculations of a neural network. The neural network processor may form part of digital signal processor. The digital signal processor may comprise a neural network kernel specifically adapted to execute operations of a neural network. Node parameters of a particular node may e.g. include a weight parameter (w) and a bias parameter (b). The non-linear function (f) associated with each node may be the same for all nodes, or different from layer to layer or from node to node. The non-linear function (f) may e.g. be represented by a sigmoid function, or a rectified linear unit (ReLU), or a softmax function. Different layers may have different non-linear functions. Parameters of the non-linear function may, however, as well be learnable (e.g. included in the optimization process). This is the case for a parametric rectified linear unit. In other words, parameters of the non-linear function (f) may form part of the node parameters.

A given neural network may be defined by a given set of node parameters.

The detector (or a part thereof) implemented by the neural network may e.g. comprise a wake-word detector, keyword detector or detector of a preferred speaker (spouse detector). The detector (or a part thereof) implemented by the neural network may e.g. alternatively of further comprise a correlation detector, a level estimator, a modulation detector, a feedback detector, a voice detector, e.g. an own voice detector, an estimator of speech intelligibility of the current electric input signal or a signal derived therefrom. The output of the detector may comprise estimates of a value or values of a specific parameter or property or content of the electric input signal, or a probability or probabilities of such estimated value(s).

The detector may comprise or form part of the neural network processor. The detector may comprise the pre-processor. The detector may comprise the post-processor.

The term 'sound in the environment' may represent any sound in the environment around the user wearing the hearing device which can reach the at least one microphone and be detectable as an electric input signal. 'Sound in the environment' may e.g. comprise any utterance from a person and any sound emitted by a machine or device in the environment. 'Sound in the environment' may include a specific word or specific words of a specific person (e.g. the user). 'Sound in the environment' may include natural sounds or background noise.

The hearing device may comprise a neural network controller connected to the neural network processor for—in the particular adaptation-mode of operation—receiving the optimized node parameters, and to apply the optimized node parameters to the nodes of the neural network to thereby implement an optimized neural network in the neural network processor. The hearing device may comprise the candidate neural networks. The candidate neural networks may be of the same type, e.g. feed forward, recurrent or convolutional. The candidate neural networks may comprise different types of neural networks. The candidate neural networks may be different in number of layers and number of nodes, e.g. some having more layers (and/or nodes in a given layer) than others. Thereby the complexity of the neural network can be adapted to the particular user.

The post-processor may be configured to provide a 'decision' based on the output vector of the neural network. The post-processor may be configured to determine a resulting (estimated) detector value based on the output vector of the neural network, e.g. based on probabilities of a number of different (estimated) detector values. The decision or resulting estimated detector value may e.g. be or comprise a specific wake-word or command word of a voice control interface, or a specific value of a voice detector, e.g. an own voice detector, e.g. indicating a presence or absence of a voice, e.g. the user's own voice.

The output of the decision unit (post-processor), the resulting signal, may e.g. be a command word or sentence or a wake-word or sentence for activating the voice control interface. The output of the decision unit (post-processor) may alternatively or additionally be fed to a transmitter (or transceiver) for transmission to another device for further processing there, e.g. to activate a personal assistant (e.g. of a smartphone or the like). The transceiver may e.g. receive a response from another device, e.g. from the personal assistant. The response can e.g. be used to control the hearing device, or it can be played for the user via the output transducer (SPK) of the hearing device.

The hearing device may comprise a sensor for sensing a property of the user or of an environment of the hearing device and for providing a sensor signal representative of a current value of said property of the environment. A property of the environment of the hearing device may in the present context comprise a property (e.g. a parameter or state) of the user wearing the hearing device. A property of the environment of the hearing device may in the present context comprise a property of the physical environment, e.g. the acoustic environment of the hearing device. The term 'a sensor' may in the present context be taken to indicate a device that provides an output signal reflecting a value of a current physical parameter which the sensor is adapted to measure. A temperature sensor gives for example as an output a current temperature of the environment of the sensor. The hearing aid may comprise a multitude of sensors. A sensor may be constituted by or comprise a movement sensor (e.g. an accelerometer), a magnetometer, an EEG sensor, an EOG sensor, a heart rate detector, or a temperature sensor, etc. A voice activity detector (VAD) or an OV-detector may as well be regarded as a sensor.

The hearing device may be configured to provide that the sensor signal is an input to the pre-processor.

The pre-processor may be configured to process the at least one electric input signal and the sensor signal to provide the feature vector. The sensor signal may be used to qualify the at least one electric input signal (e.g. exclude certain time segments (or frequency bands) thereof) before the feature vector is created. Alternatively or additionally, the sensor signal (or characteristics thereof) may be included in the feature vector provided by the pre-processor as an input vector to the neural network.

The hearing device may comprise an output unit for presenting said processed output signal to the user as stimuli perceivable as sound to the user. The output unit may comprise an output transducer. The output unit (e.g. the output transducer) may comprise a loudspeaker of an air conduction hearing device, or a vibrator of a bone conduction hearing device, or a multi-electrode array of a cochlear implant hearing device. The output unit may comprise a transmitter for transmitting the resulting (detector) signal and/or the output (audio) signal to another device.

The hearing device may comprise an analysis filter bank for converting a time domain input signal to a number of frequency sub-band signals providing the input signal in a time-frequency representation (k,l), where k and l are frequency and time indices, respectively. The input transducer may comprise an analysis filter bank for each electric input signal, and/or the sensor signal. The hearing device may comprise an analysis filter bank for converting a time domain sensor signal to a number of frequency sub-band signals providing the sensor signal in a time-frequency representation (k, l), where k and l are frequency and time indices, respectively. The feature vector may be provided in a time-frequency representation. If reconstruction of a time domain signal is not required (it is not required if we just utilize the feature vector for a detector), the filter bank may be down-sampled with a factor above the critical down-sampling. We may as well utilize a smaller subset of the available frequency channels of the filter-bank as well as we may sum frequency channels together. The filter-bank channels may be low-pass filtered before being down-sampled.

The pre-processor may be configured to extract characteristics of the at least one electric input signal and/or of the sensor signal. Characteristics of the at least one electric input signal may e.g. comprise modulation, level, signal to noise ratio, correlation, etc. The feature vector may exhibit a reduced complexity compared to the at least one electric input signal and/or of the sensor signal from which the characteristics are extracted. The feature vector may be provided in a time-frequency representation of the audio signal (e.g. obtained by a filter bank or a warped filter bank). The time frequency representation may be further processed into a magnitude response, and the response may be low-pass filtered and/or down-sampled. In case the hearing device comprises a multitude of microphones (and thus has access to a multitude of electric input signals representing sound) some or all of the electric input signals may be combined into a directional (beamformed) signal, e.g. a directional signal enhancing the user's own voice. The directional signal may be further enhanced by noise reduction, e.g. using a post-filter.

The time segment of corresponding values of the at least one electric input signal and optionally the sensor signal covered by a given feature vector are used as input to the input layer of the neural network comprises at least one time frame of the at least one electric input signal. The time segment may comprise a multitude of time frames of the at least one electric input signal, e.g. more than three, such as more than five time frames, such as in the range of 2 to 50 time frames, e.g. corresponding to up to 0.5 to 1 s of audio, e.g. corresponding to one or more words.

The communication link established by the transmitter and receiver circuitry of the transceiver of the hearing device may be a wireless link. The wireless link may be an inductive link based on inductive coupling between inductors of the hearing device and the (an)other device or server. The wireless link may be based on radiated fields, e.g. based on Bluetooth or WLAN transceivers in the hearing device and the (an)other device or server.

The hearing device is configured to operate in a number of modes, including a particular adaptation-mode of operation and a normal mode of operation. Whether the user is allowed to enter the adaptation mode may depend on whether the hearing device is detected to be mounted on the ears. The particular adaptation-mode of operation may e.g. be a mode of operation where the hearing device is connected to an auxiliary device (comprising a processor, e.g. of a smartphone or of a PC or laptop computer, etc.). The auxiliary device may e.g. be configured to execute fitting software of the hearing device. The fitting software may be configured to customize (personalize) algorithms of the hearing device to a particular user's needs, including to determine optimized node parameters of a neural network to be applied in the hearing device as part of the personalization of the hearing device to the particular user in question. The set of optimized node parameters of a neural network for a given user may be selected among a number of predefined, optimized node parameters according to an appropriate selection algorithm. The number of predefined, optimized node parameters, of candidate neural networks for use in a customized hearing device may be stored in the hearing device. Thereby a selection of an appropriate set of optimized node parameters can be performed without the use of an auxiliary device, e.g. by the user him- or herself. We may also imagine a decision based on one NN running in one hearing device and another NN running in another device. One NN may e.g. be used in low-SNR environments and the other NN may be used in high-SNR environments.

The detector or a part thereof implemented by the neural network may be an own voice detector and/or a key word detector. An own-voice detector may be implemented by the neural network. A key word detector (e.g. a wake-word detector) may be implemented by the neural network. A key word detector (e.g. a wake-word detector) specifically optimized to detect words spoken by the user may be implemented by the neural network. The neural network may additionally or alternatively implement an on/off detector, or a preferred speaker(s) detector, e.g. a spouse (voice) detector.

The hearing device may be constituted by or comprising a hearing aid, a headset, an earphone, an ear protection device or a combination thereof.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing device) or a vibrator of a bone conducting hearing device. The output unit may comprise an output transducer. The output transducer may comprise a receiver (loudspeaker) for providing the stimulus as an acoustic signal to the user (e.g. in an acoustic (air conduction based) hearing device). The output transducer may comprise a vibrator for providing the stimulus as mechanical vibration of a skull bone to the user (e.g. in a bone-attached or bone-anchored hearing device).

The hearing device comprises an input transducer for providing an electric input signal representing sound. The input transducer may comprise a microphone, for converting an input sound to an electric input signal. The input transducer may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form. The hearing device may, e.g. as part of the noise reduction system, further comprise a spatially-based post-filter.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device. The direct electric input signal may represent or comprise an audio signal and/or a control signal and/or an information signal. The hearing device may comprise demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. The wireless link is established between two devices, e.g. between an entertainment device (e.g. a TV) and the hearing device, or between two hearing devices, e.g. via a third, intermediate device (e.g. a processing device, such as a remote control device, a smartphone, etc.). The wireless link is typically used under power constraints, e.g. in that the hearing device is or comprises a portable (typically battery driven) device. The wireless link is a link based on near-field communication, e.g. an inductive link based on an inductive coupling between antenna coils of transmitter and receiver parts. In another embodiment, the wireless link is based on far-field, electromagnetic radiation. The communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link is based on a standardized or proprietary technology. The wireless link is based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 20 g.

The hearing device may comprise a forward or signal path between an input unit (e.g. an input transducer, such as a microphone or a microphone system and/or direct electric input (e.g. a wireless receiver)) and an output unit, e.g. an output transducer. The signal processor is located in the forward path. The signal processor is adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.). Xx, some or all signal processing of the analysis path and/or the signal path is conducted in the frequency domain. Xx, some or all signal processing of the analysis path and/or the signal path is conducted in the time domain.

Xx, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. Xx, a number of audio samples are arranged in a time frame. Xx, a time frame comprises 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. It should be mentioned that although the (maximum) sample rate in the hearing device is e.g. 20 kHz (supporting an audio frequency range of 0-10 kHz) in a forward path of the hearing device, a different smaller frequency range may be used in other parts of the hearing device. The hearing devices comprise a digital-to-analogue (DA) converter to convert a digital signal to an analogue output signal, e.g. for being presented to a user via an output transducer.

The hearing device, e.g. the input transducer, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. Xx, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. The hearing device is/are adapted to process a signal of the forward and/or analysis path in a number NP of different frequency channels (NP≤NI). For detectors e.g. for analyzing a signal of the forward path, e.g. the electric input signal, we may have fewer channels, e.g. NP'≤NP. The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device. A mode of operation may include the specific adaptation mode where the hearing device is connected to a number of different candidate neural networks (e.g. located in the hearing device or in an auxiliary device), one of which is intended for being chosen for use in the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may be configured to operate on the full band signal (time domain) One or more of the number of detectors may be configured to operate on band split signals ((time-) frequency domain), e.g. in a limited number of frequency bands.

The number of detectors may comprise a level detector for estimating a current level of a signal of the forward path. The predefined criterion may comprise whether the current level of a signal of the forward path is above or below a given (L-)threshold value. One or more of the level detectors may operate on the full band signal (time domain) One or more of the level detectors may operate on band split signals ((time-) frequency domain).

The hearing device may comprise a voice activity detector (VAD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice activity detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activicty detector is adapted to detect as a VOICE also the user's own voice. Alternatively, the voice detector is adapted to exclude a user's own voice from the detection of a VOICE.

The hearing device may comprise an own voice detector for estimating whether or not (or with what probability) a given input sound (e.g. a voice, e.g. speech) originates from the voice of the user of the system. The microphone system (or the own voice detector) of the hearing device may be adapted to be able to differentiate between a user's own voice and another person's voice and possibly from NON-voice sounds.

The number of detectors may comprise a movement detector, e.g. an acceleration sensor. The movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may further comprise other relevant functionality for the application in question, e.g. compression, noise reduction, feedback control, etc.

The hearing device may comprise a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of selecting optimized parameters for a neural network for use in a portable hearing device is furthermore provided by the present application. The method comprises Providing a portable hearing device to be used by a particular user; the hearing device comprising a neural network processor adapted to implement a neural network comprising an input layer and an output layer and a number of hidden layers, each layer comprising a number of nodes, each node being defined by a number of node parameters and a non-linear function, the neural network being configured to receive an input vector and to provide an output vector as a specific non-linear function of the input vector, Mounting the hearing device at or on the user;

Providing an auxiliary device;

Establishing a communication link allowing the exchange of data between the hearing device and the auxiliary device;

In the hearing device, the method may further comprise:
Providing at least one electric input signal representing sound in the environment of the user wearing the hearing device;
Processing said at least one electric input signal and providing a feature vector representative of a time segment of said at least one electric input signal,
Transmitting said feature vector or feature vectors to said auxiliary device via said communication link.
In the auxiliary device, the method may further comprise:
Providing a multitude of pre-trained candidate neural networks, each candidate neural network having the same structure as the neural network of the hearing device, where each pre-trained network is considered a candidate for the person, and wherein each pre-trained neural network has been trained on fully or partially different training data;
Receiving said feature vector(s) from the hearing device and providing them as input vectors to said multitude of pre-trained candidate neural networks;
Determining by said multitude of pre-trained candidate neural networks respective output vectors corresponding to said feature vector(s);
Comparing said output vectors and selecting one of the multitude of candidate neural network as the optimized neural network for the hearing device according to a predefined criterion;
Transmitting node parameters for the selected one of the multitude of candidate neural networks to the hearing device via said communication link, and
In the hearing device, the method may further comprise:
Receiving said node parameters and feeding them to said neural network processor and applying them to said neural network.

In a further aspect, a method of selecting optimized parameters for a neural network for use in a portable hearing device is provided by the present disclosure. The method comprises
Providing a portable hearing device to be used by a particular user; the hearing device comprising a neural network processor adapted to implement a neural network comprising an input layer and an output layer and a number of hidden layers, each layer comprising a number of nodes, each node being defined by a number of node parameters and a non-linear function, the neural network being configured to receive an input vector and to provide an output vector as a specific non-linear function of the input vector,
Mounting the hearing device at or on the user;
Providing at least one electric input signal representing sound in the environment of the user wearing the hearing device;
Processing said at least one electric input signal and providing a multitude of feature vectors, each being representative of a time segment of said at least one electric input signal,
Providing a multitude of pre-trained candidate neural networks, where each pre-trained network is considered a candidate for the user, and wherein each pre-trained neural network has been trained on fully or partially different training data;
Receiving said feature vector and providing them as input vectors to said multitude of pre-trained candidate neural networks;
Determining by said multitude of pre-trained candidate neural networks respective output vectors corresponding to said feature vectors;
Comparing said output vectors and selecting one of the multitude of candidate neural network as the optimized neural network for the hearing device according to a predefined criterion regarding said output vectors;
Transmitting node parameters for the selected one of the multitude of candidate neural networks to the neural network processor of the hearing device, and
Receiving said node parameters in said neural network processor and applying them to said neural network.

It is intended that some or all of the structural features of the device described above, in the 'detailed description of embodiments' or in the claims can be combined with embodiments of the respective methods, when appropriately substituted by a corresponding process and vice versa. Embodiments of the methods have the same advantages as the corresponding devices.

The term 'neural network having the same structure as the neural network of the hearing device' is taken to indicate that each of the candidate neural networks of the have the same number of layers, and the same number of nodes in each layer, but each candidate neural network has different node parameters (weight and/or bias, and/or non-linear function) determined by pre-training with different sets of training data. A given neural network may be defined by a given set of node parameters.

The different candidate neural networks may e.g. be trained based on data from different groups (divided by age, gender), and the selected network solely was based on providing information about the person (such as age and/or gender).

The term, 'the pre-trained neural network has been trained on fully or partially different training data' is e.g. intended to include that the noise part of the training data may be similar Noise may e.g. include training data without any relevant speech elements to detect. Training data may also include speech data that are close to (but different from) words intended to be detected by the detector (e.g. a keyword detector).

The predefined criterion may be based on the performance of the neural network in terms of true positives, false positives, true rejections and false rejections.

Different metrics can be derived from the four terms TP, TN, FP and FN. (true positive/negative, false positive/negative), e.g. 'Accuracy'=TP+TN/(TP+TN+FP+FN), 'Precision'=TP/(TP+FP) or 'Recall'=TP/(TP+FN), (see e.g. https://developers.google.com/machine-learning/crash-course/classification/accuracy?).

Each of the candidate neural networks may have the same structure. At least some (e.g. one) of the candidate neural networks may have different structure from the rest of the candidate neural networks, e.g. different number of layers or different number of nodes. The candidate neural networks may comprise different types of neural networks. The type of neural network may e.g. be selected among feedforward, recurrent, convolutional, etc.

Each of the candidate neural networks may have been trained on training data from different classes of persons. Such training procedure may be relevant for an own voice application, e.g. own voice detection (OVD) and keyword spotting (KWS) (e.g. wake word detection). Different groups of persons belong to different classes. Classes may e.g. be generated from a basic group of persons as outlined in connection with FIG. 6. Different classes of persons may exhibit different acoustic properties, e.g. different head related transfer functions (HRTF), different voices ('spectral signature', fundamental frequencies and/or format frequencies, etc.), different ages, different gender, etc.

A signal (e.g. from a sensor) representative of a current value of a property of the user or the environment of the user may be provided in the hearing device and processed together with the at least one electric input signal to provide said feature vector.

The method may be configured to provide that the neural network implements an own voice detector (OVD) and/or a keyword detector (KWD).

The method may comprise prompting the user to speak. The method may be configured to prompt the user to speak one or more (e.g. predefined) words or sentences (e.g. including words or sentences that resemble words or sentences that the detector is intended to identify or detect). The one or more words or sentences may thereby form the basis for at least some of the multitude of feature vectors. Thereby the output vectors of the candidate neural networks may be known (ground truth), which can be used to check whether a criterion regarding which of the candidate neural networks (i.e. with each their neural network parameters, e.g. optimized to a specific class of person) fulfills the criterion (e.g. fits the current user best).

The predefined criterion for selecting the optimized neural network parameters may be based on prompted words or sentences spoken by the user. The optimized neural network parameters may be selected by comparing output vectors from said candidate neural networks having said respective neural network parameters (e.g. optimized to a specific class of person) based on said prompted words or sentences spoken by the user. The selected neural network parameters may be the parameters from the candidate neural network that best fulfils the predefined criterion (e.g. has the highest number of correct values of the output vectors when the user speaks the prompted words or sentences).

The method may comprise providing several sets of a multitude of pre-trained candidate neural networks, each candidate neural network for each set having the same structure as the neural network of the hearing device, where each pre-trained network is considered a candidate for the person, and wherein each pre-trained neural network has been trained on fully or partially different training data, and wherein each set of pre-trained candidate neural networks is aimed at implementing a different detector. Thereby simultaneous selection of optimized parameters for several different neural networks implementing different detectors can be performed. Different detectors may e.g. include a keyword detector for detecting a limited number of keywords (e.g. command words), a wake-word detector for detecting a specific word or combination of words for activating a voice interface, etc.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

The hearing system is adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be or comprise a remote control for controlling functionality and operation of the hearing device(s). The function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

An App:

In a further aspect, a non-transitory application, termed an APP, is furthermore provided by the present disclosure. The APP may comprise executable instructions configured to be executed on an auxiliary device to implement a user interface for a hearing device or a hearing system described above in the 'detailed description of embodiments', and in the claims. The APP is configured to run on cellular phone, e.g. a smartphone, or on another portable device allowing communication with said hearing device or said hearing system.

Definitions

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). The hearing device may comprise a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications such as hearing aids or headsets, or similar devices.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
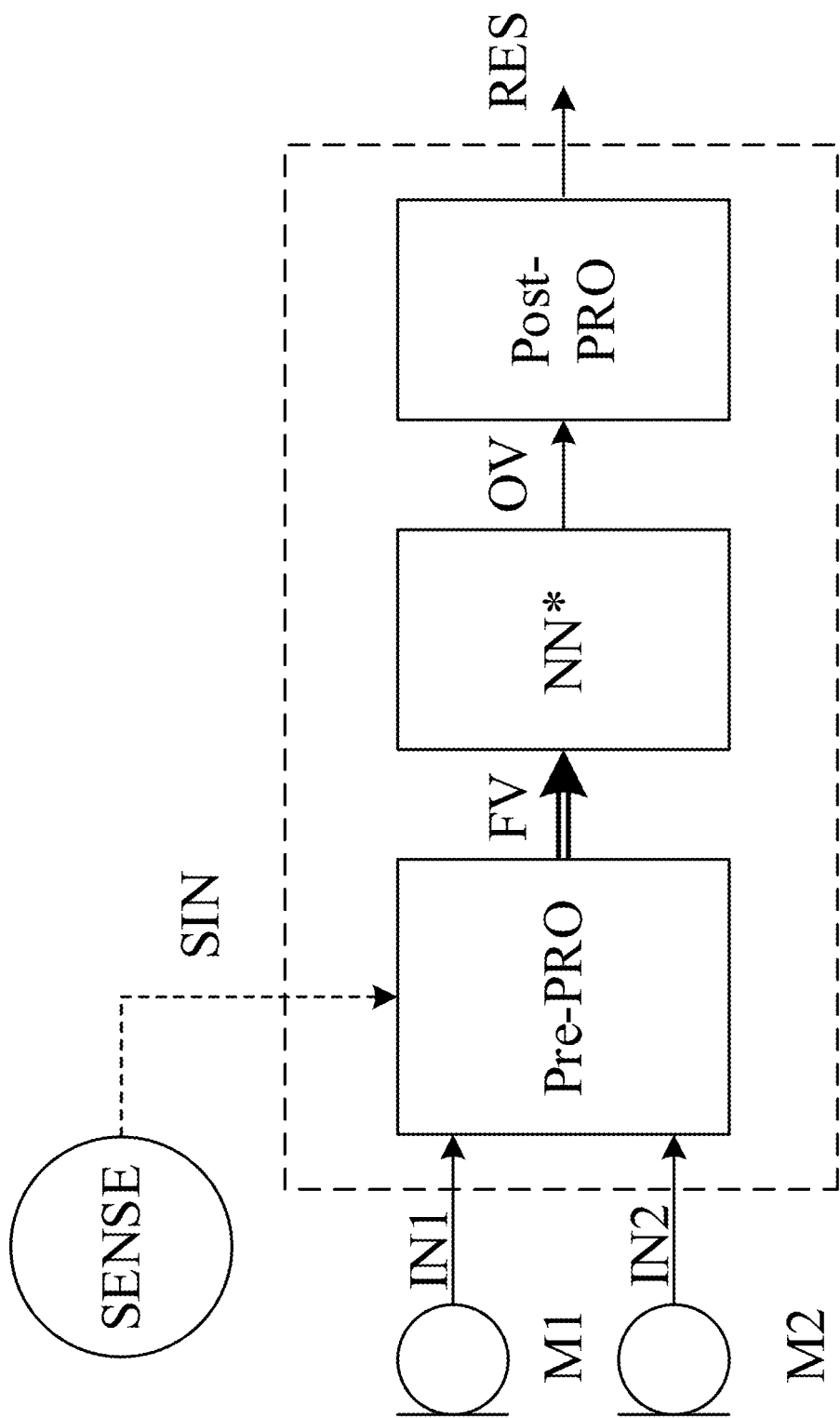
FIG. 1 shows a part of a hearing instrument with a built-in detector according to the present disclosure.

The present application relates to the field of hearing devices, e.g. hearing aids. Consider a hearing instrument system with microphones and possibly other sensors (e.g. an accelerometer, a magnetometer, an EEG sensor, and/or a heart rate detector, etc.) as shown in FIG. 1. The hearing instrument may have a built-in detector (e.g. including one or more of the mentioned sensors).

Detectors such as environment detectors, own voice detectors, or keyword detectors often require parameter tuning. A detector, e.g. the provision of decisions or one or more estimated values of parameters or probabilities of such estimated parameter values from the detector may e.g. be implemented using or based on supervised learning, e.g. fully or partly using a neural network architecture. As the architecture of a neural network is very general, a neural network typically requires many parameters, such as weights and bias parameters. Due to limited memory in a hearing device, it is desirable that the implemented neural network has as few parameters as possible. Furthermore, due to a limited bandwidth during programming, it is desirable to transmit as few parameters as possible to the hearing instrument. An option may be to retrain only some layers, e.g. keeping the weights of the first layer(s) of the neural network fixed and only update deeper layers. Hereby fewer parameters need to be programmed.

One way achieve better performance is to personalize the parameters of the neural network/detector. E.g., a neural network optimized for a specific person or a specific group of persons (e.g. voices of male, female or children, different ages, different languages or noise environments which are common for a given person) may work better compared to a neural network which has been optimized to work well for any group of persons.

Here we propose a method for selecting a personalized neural network.

FIG. 1 shows a part of a hearing instrument with a built-in detector. The input signals (IN1, IN2, SIN) from one or more microphones (M1, M2) and/or one or more sensors (SENSE) are pre-processed (cf. unit 'Pre-PRO') into a feature vector (FV). The one or more sensors (SENSE) may be dispensed with, so that the input signals to the pre-processor (Pre-PRO) only are the electric input signals (IN1, IN2) from the microphones (M1, M2), and hence, so that the feature vector only depends on the electric input signals (IN1, IN2) from the microphones (M1, M2). The pre-processed feature vector (FV) is used as input to a neural network (NN). The output of the neural network (NN) may e.g. be a probability or a set of probabilities (p(x)) used to make a decision/or detection (e.g. detection of a specific word, own voice detection or detection of a certain sound environment, cf. decision unit 'PostPRO', and output RES). The output RES of the decision unit may e.g. be used to decide on a particular action, e.g. in the hearing device, e.g. to activate a voice control interface. The output RES of the decision unit may e.g. be transmitted to another device or system, e.g. for activating a service.

In FIG. 1, the hearing device comprises a single neural network implementing a (single) detector, e.g. an own voice detector. The hearing device may e.g. comprise several neural networks working in parallel. The hearing device may e.g. comprise one neural network for implementing a key-word detector and another neural network for implementing an own voice detector. In such case the same scheme for selecting an optimized neural network for a particular user among a multitude of optimized candidate neural networks, e.g. even optimized at the same time. In such case, two or more, e.g. first and second, groups of respective multitudes of optimized candidate networks, each group of neural networks being optimized to implement a particular detector (e.g. a key word detector, and an own voice detector, respectively), each of the candidate networks of the first and second groups receive the same input vectors from the user (from the hearing device) at the same time (see FIG. 2 for a single group of candidate networks). When reference is made to groups of networks as representing different detectors, the first and the second group do not necessarily have the same input vector. A group of (candidate) NNs each implementing a given type of OV detector may have different input features than a group of NNs for wake word detection.

A neural network can be regarded as a generalized non-linear function of the input signals optimized in order to achieve a certain behaviour of an output signal. Whereas passing a signal through a neural network has relatively low complexity, estimating the parameters of the neural network is computationally heavy and (very) time consuming. To personalize a neural network, the neural network needs to be trained based on data from the specific person. Even though the network may only be partly trained to the individual person, e.g. using techniques known as transfer learning, the training procedure as well as the data collection may still be very time consuming. Regarding transfer learning, the hearing device may be configured to only update a part of the neural network parameters (e.g. the parameters of the p last layers). Hereby less parameters in the hearing instrument needs to be updated.

As an alternative to optimizing a neural network for an individual, we propose to select between a number of pre-trained neural networks, where each pre-trained network is considered a candidate for the person. Each pre-trained neural network may be trained on data from a certain class of persons. The number of pre-trained neural networks depends on how the actual classification into group classes is performed.

Figure 7A:
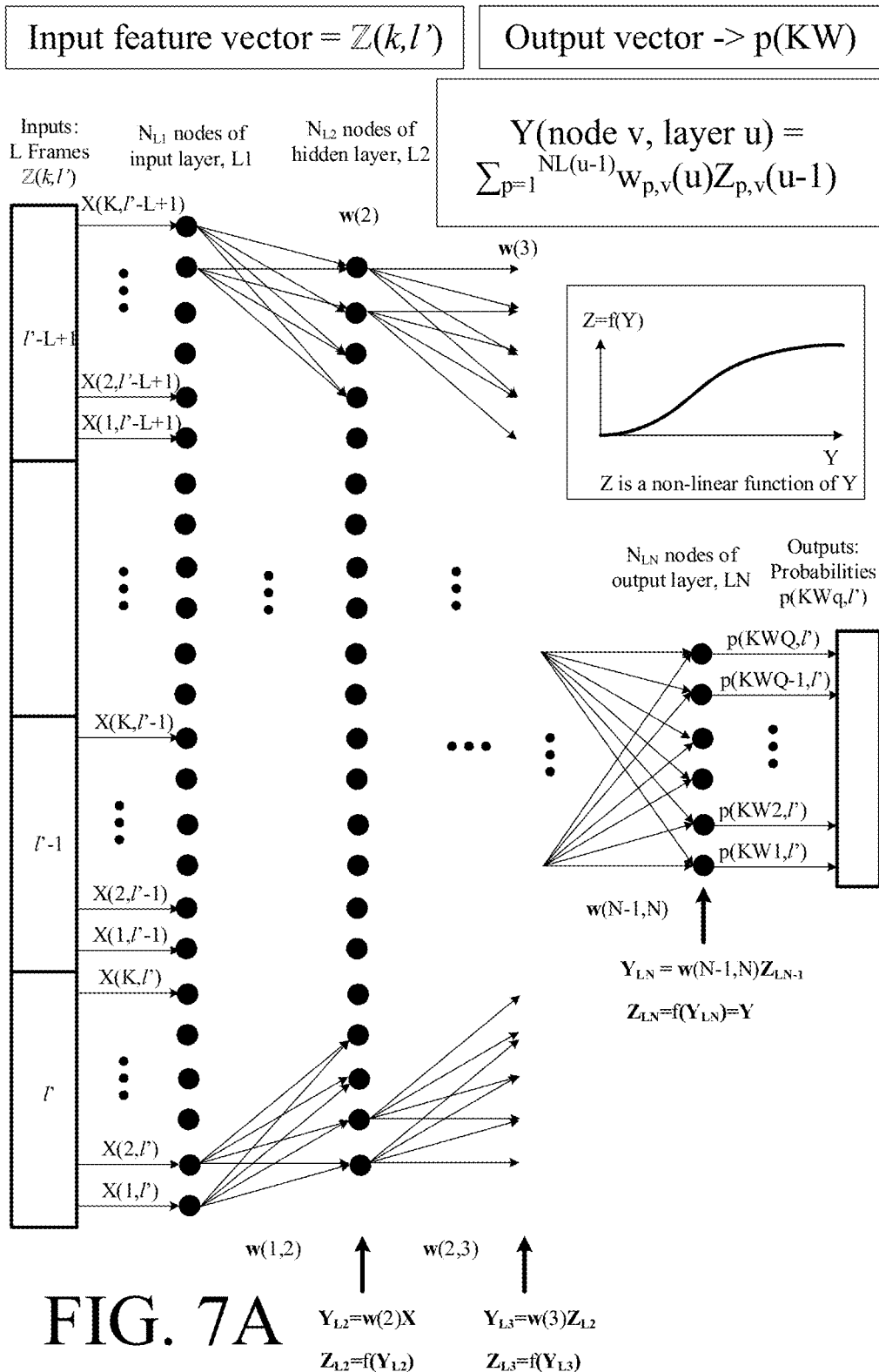
FIG. 7A shows an embodiment of a keyword detector implemented as a neural network according to the present disclosure.
Figure 7B:
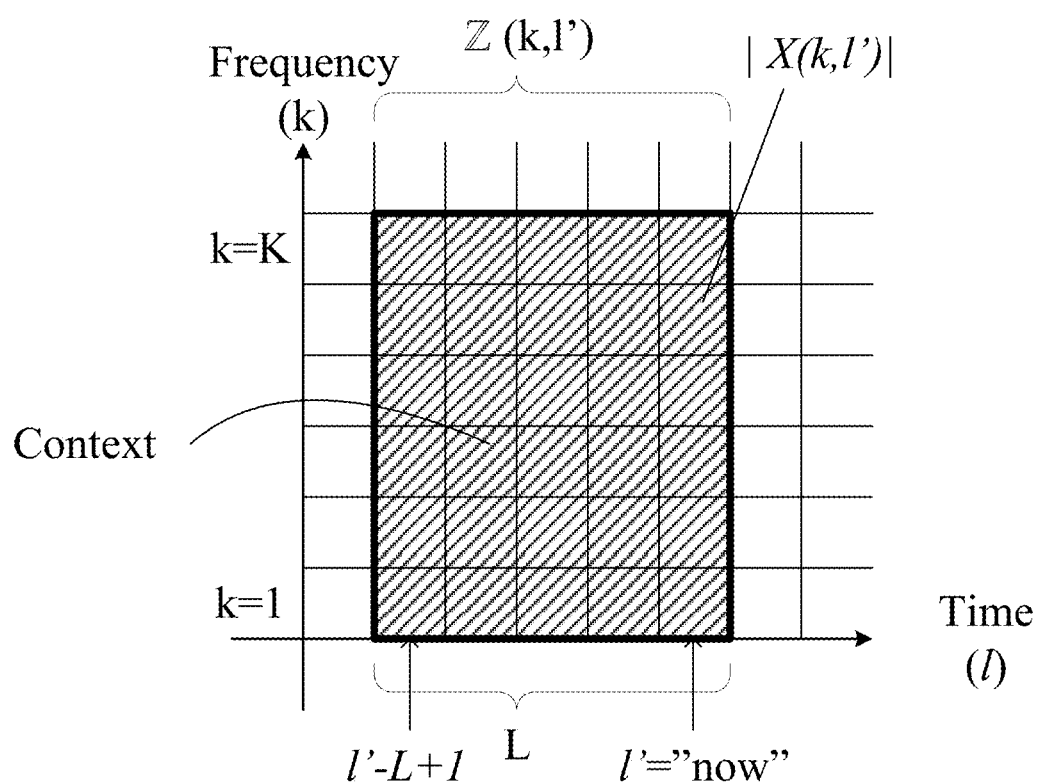
FIG. 7B shows the context of an electric input signal comprising audio used to generate an input vector for the neural network of FIG. 7A.

An exemplary neural network, including input and output vectors is schematically illustrated in FIG. 7A, 7B. It should be emphasized, though, that also other NN structures may be utilized.

Figure 2:
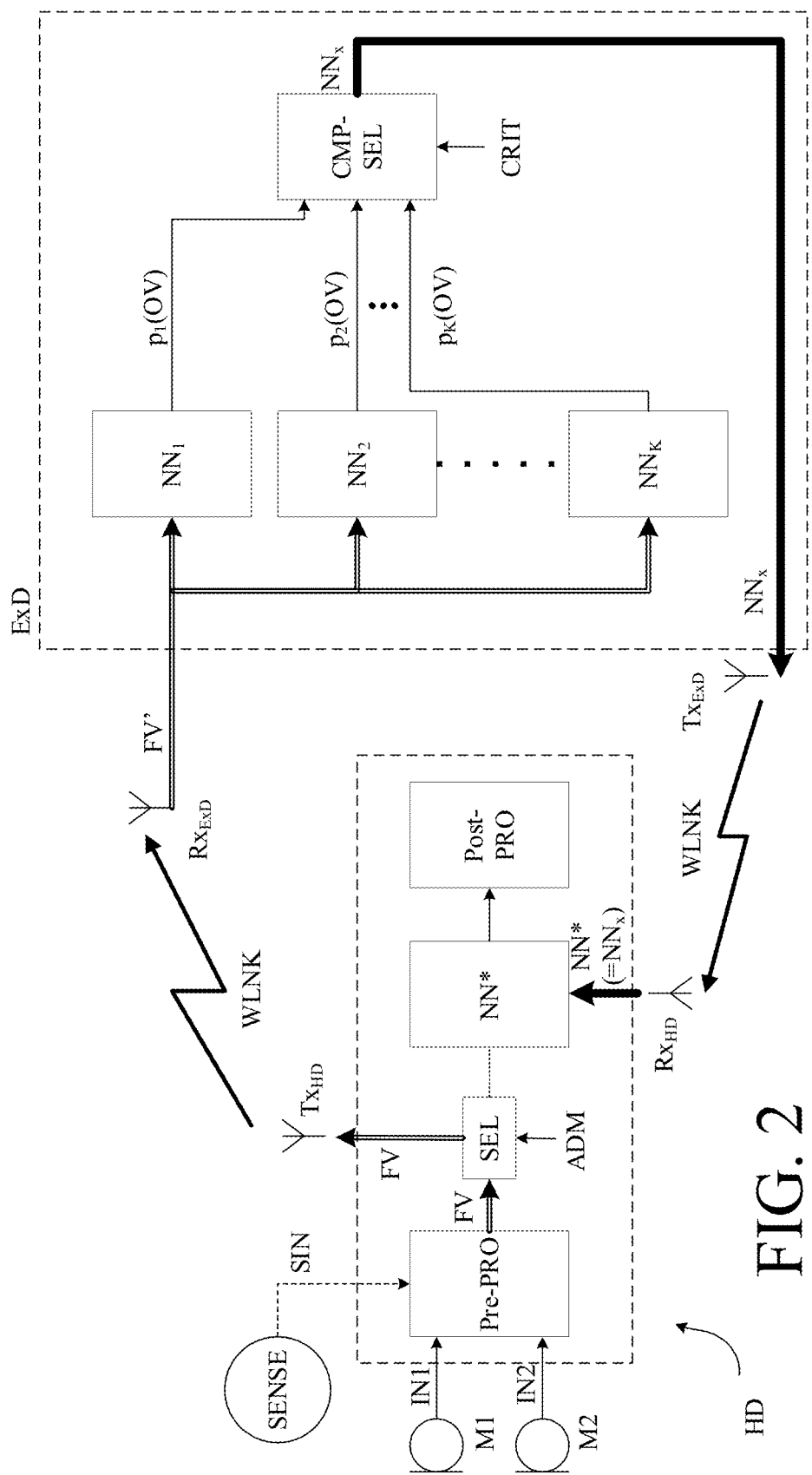
FIG. 2 shows a hearing instrument wirelessly connected to an external unit illustrating the procedure for selecting an optimized neural network for use in the hearing instrument according to the present disclosure.

Consider the system shown in FIG. 2. FIG. 2 shows a hearing instrument wirelessly connected to an external unit illustrating the procedure for selecting an optimized neural network for use in the hearing instrument according to the present disclosure. Whereas the hearing instrument (HD) has limited memory and computational capacity (due to size constraints), the external device (ExD) has much more computational capacity and much more available memory. This allows the external device to rapidly evaluate the (possibly pre-processed) hearing instrument sound (in the form of feature vector FV) provided as input (FV') to several neural networks ($NN_1, \ldots, NN_K$), which have been pre-trained e.g. for different groups of people but implementing the same detector, e.g. an own voice detector. Based on sound examples (FV') from the hearing device (HD), cf. e.g. FIG. 3, the different neural networks ($NN_1, \ldots, NN_K$) are assessed. The parameters for the network having the highest performance are utilized in the hearing instrument. Evaluation of the relative performance of the neural networks may e.g. be carried out in terms of a comparison of the number of true positives, false positives, true rejections and false rejections. In the example of FIG. 2, the outputs of the different neural networks are respective probabilities $p_i(OV)$, $i=1, \ldots, K$, for a detection of own voice. The probabilities are e.g. compared to the truth (i.e. whether or not the feature vector represents sound spoken by the user) in order to access the best performing network for a given person. In another example, the neural networks may be optimized to detect a number Q of predefined key words, e.g. of a voice interface. In such case the output vector of each of the neural networks would represent probabilities that a given input feature vector (e.g. originating from words spoken by the user and picked up by the hearing aid microphone(s)) equals each of the predefined key words (output vector comprises $p(KWi)$, $i=1, \ldots, Q$). The number Q of keywords may e.g. be in the range between 1 and 10. A wake word detector may be implemented (Q=1) to detect a single key word or key phrase, e.g. 'Hey Siri' or 'Open sesame', etc.

The system consists of a hearing device (HD) capable of wirelessly transmitting (via wireless link (WLNK), e.g. an audio link) an audio signal or a feature vector (FV) derived from the audio signal to an external device (ExD). The external device (ExD, e.g., a smartphone or a PC used during fitting of the hearing device), which has much more memory and much more computational power compared to the hearing instrument, is able to evaluate different pre-trained candidates for neural network parameters to select the set of parameters (among the candidates) which works best for the user of the hearing device. Based on different audio examples, the external device can select the best candidate and the hearing device will be updated with the parameters of the best candidate.

To save computation and transmit as little data as possible, the audio recorded at the hearing devices, possibly along with sensor data such as data obtained from an accelerometer, may be pre-processed (cf. unit Pre-PRO) into the feature vectors (FV) which are used as input to the neural network. An example of a feature vector may be a time-frequency representation of the audio signal (obtained by a filter bank or a warped filter bank). The time frequency representation may be further processed into a magnitude response, and the response may be low-pass filtered and/or down-sampled. Different microphone signals may be combined into a directional microphone signal, e.g. a directional signal enhancing own voice. The directional signal may be further enhanced by noise reduction using a post-filter.

In relatively low-complexity situations, the hearing device may be configured to host the candidate neural networks (for which optimized node parameters may be stored in the hearing device in advance of its fitting to a particular user). Thereby the selection and installation of the candidate neural network that best fits the user's needs can be performed fully by the hearing device itself (without the hearing device having to be connected to an external device, i.e. the transceiver circuitry can be dispensed with).

The feature vector (FV) may depend on the application. The feature vector (FV) may e.g. be or comprise a complex-valued output from a filter bank or simply the magnitude (or squared-magnitude) of the filter bank output. Alternative or additional feature vectors may be cepstral coefficients such as Mel Frequency Cepstral Coefficients (MFCC) or Bark Frequency Cepstral Coefficients (BFCC). In the case of own voice detection, the feature vector (FV) may contain information about the transfer function between different microphone signals.

Figure 3:
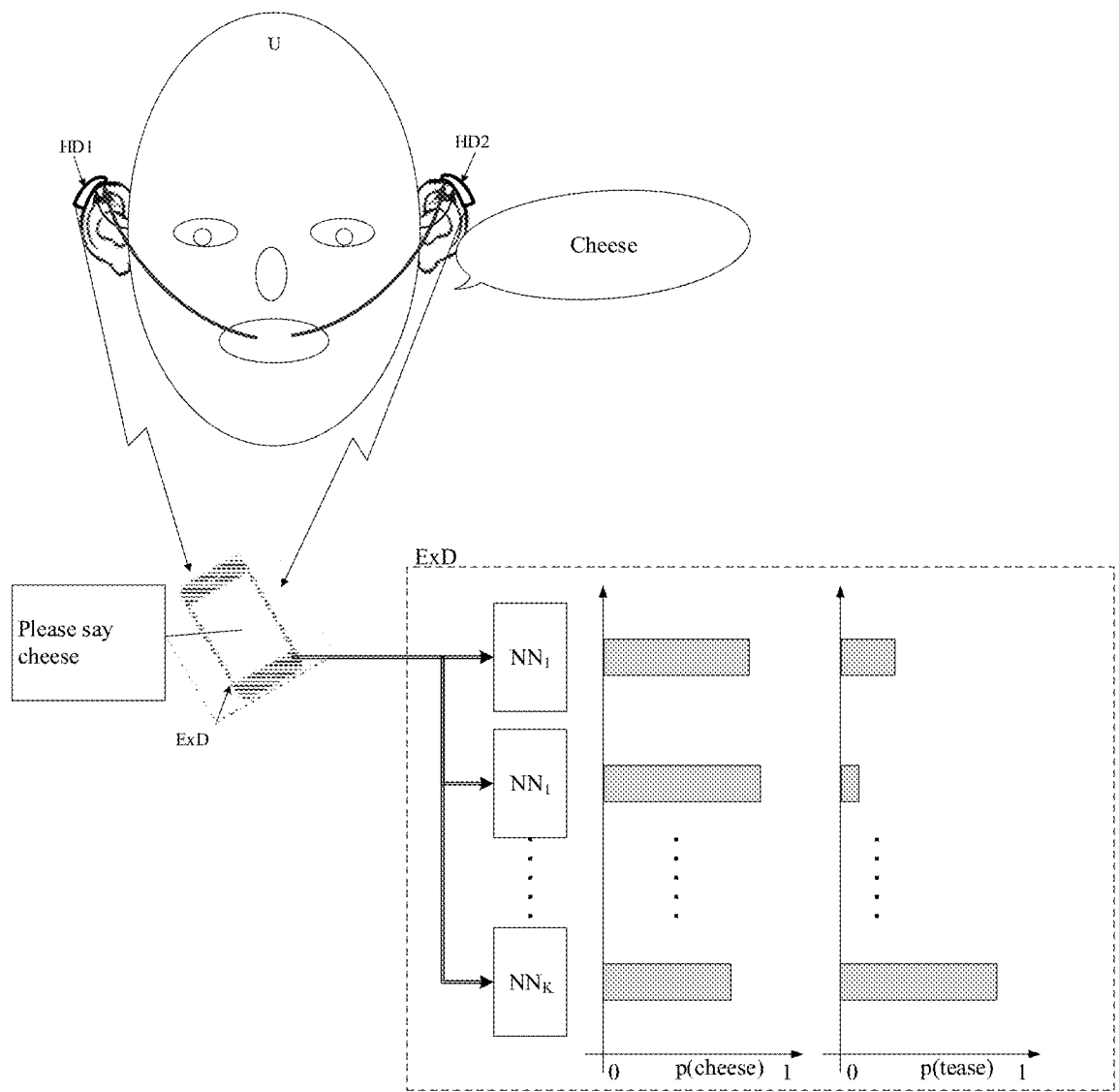
FIG. 3 shows an exemplary personalization procedure of hearing device parameters according to the present disclosure.

FIG. 3 shows an exemplary personalization procedure of hearing device parameters according to the present disclosure.

Figure 4:
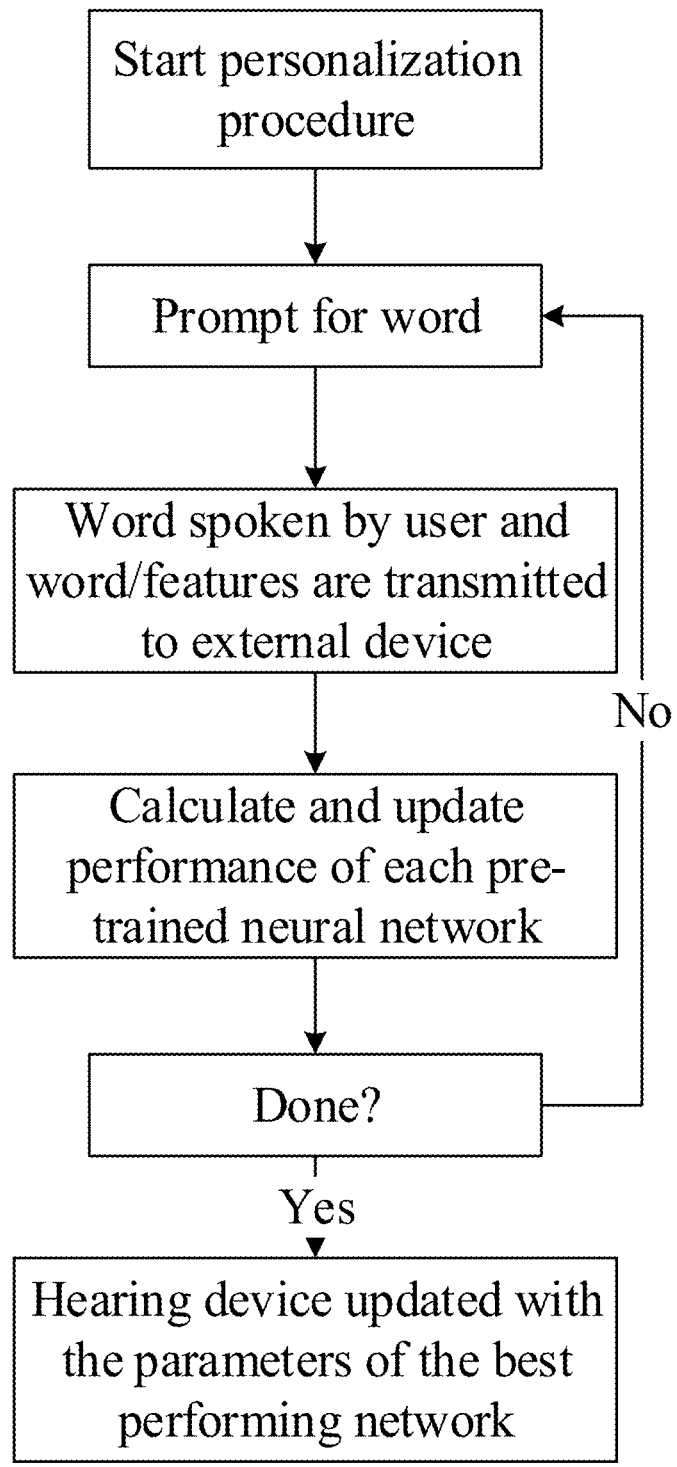
FIG. 4 shows a flowchart showing an embodiment of the proposed method for selecting a personalized neural network.

FIG. 3 shows an example of how the proposed training procedure may be used. Via the external device (ExD), the user is prompted to repeat an audio sequence, e.g. a specific word (e.g., for keyword spotting the audio sequence can consist of keywords and confusion words). The audio sequence, here the word 'cheese', (or a feature derived therefrom) is picked up by the hearing device or hearing devices (HD1, HD2) and transmitted (possibly as a pre-processed feature vector) to the external unit (ExD). The data is applied to K different pre-trained neural networks ($NN_1, \ldots, NN_K$). For each prompted input, the external device evaluates each of the neural network candidates, e.g. in terms of probability of correct word (here p(cheese)), probability of incorrect detection (here p(tease)), receiver-operating-curve or other performance measures. Based on the evaluated words (e.g. all prompted words), the best performing network is selected, and the parameters of the network are programmed into the hearing instrument(s). In order to evaluate in different noisy environments, different types of background noise may be added to the recorded sound e.g. in the external device. FIG. 4 shows a flowchart of the proposed method of selecting optimized parameters for a neural network.

FIG. 4 shows a flowchart showing an embodiment of the proposed method for selecting a personalized neural network. The procedure comprises the steps:

S1. Start personalization procedure
S2 Prompt for word
S3. Word spoken by user and word/features are transmitted to external device
S4. Calculate and update performance of each pre-trained neural network (cf. $NN_1, \ldots, NN_K$ in FIG. 2, 3)
S5. Done?
If No, revert to step S2,
If Yes, go to next step.
S6. Hearing device updated with the parameters of the best performing network (cf. transmission of parameters for neural network NNx to the hearing device and application to the neural network NN* in FIG. 2).

The user may as well be prompted for other words, e.g. typical confusion words. E.g. peace vs. cheese or prompted to read a text not containing the desired word.

In the case of own voice (OV) detection, one could imagine different networks trained for groups of people having similar OV transfer functions between the microphones. Given a measured OV transfer function (TRF) for an individual, the distance between the measured OV TRF and the OV TRF representing each neural network could be measured. The neural network represented by the OV TRF with the highest similarity may then be chosen for use in the hearing device. Alternatively, the similarity between the measured OV TRF and the OV TRF representing the different neural networks could be measured based on the neural network providing the OV best detection.

Figure 5:
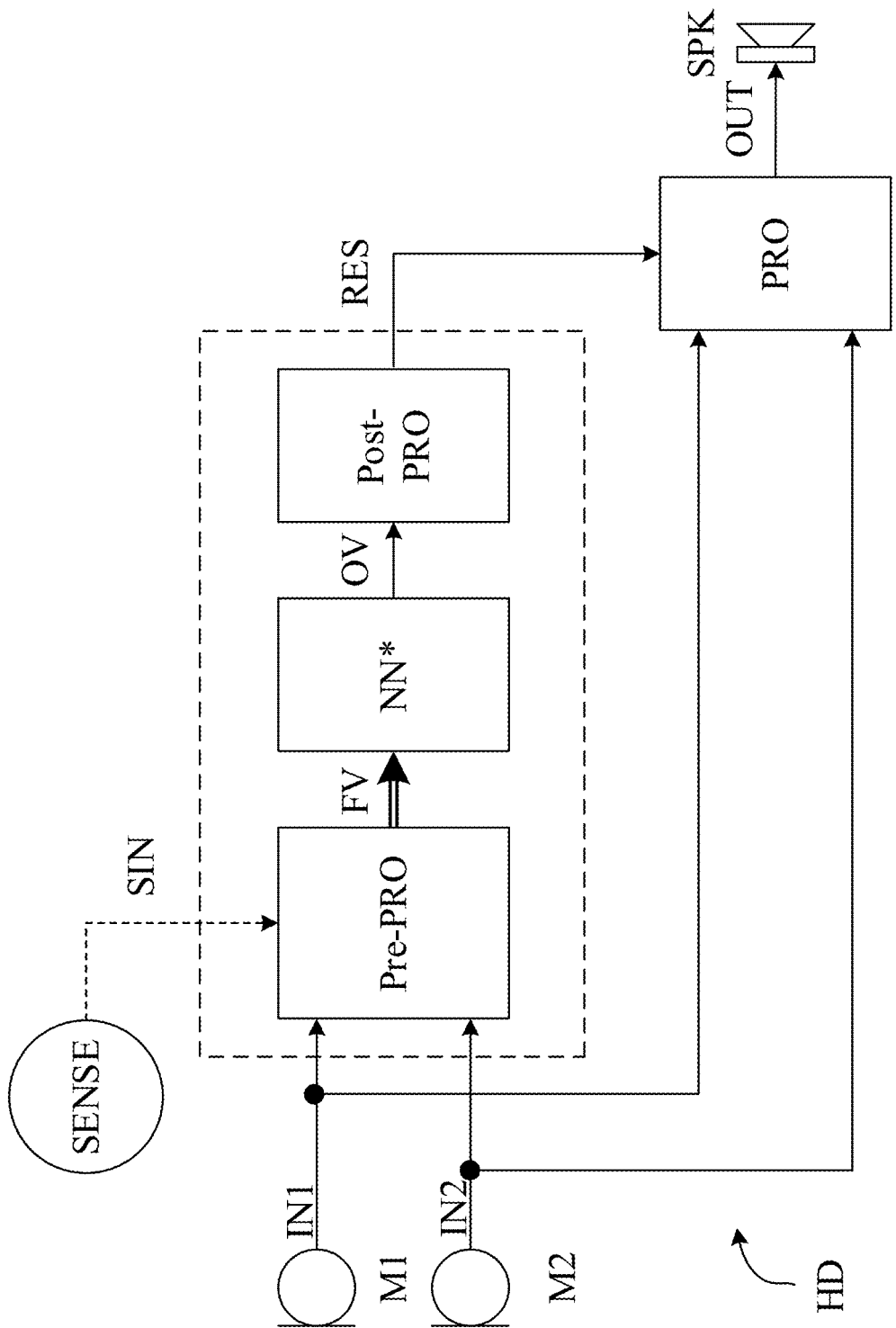
FIG. 5 shows a hearing device according to an embodiment of the present disclosure using a trained (personalized to a particular user) neural network to control processing of signals representing sound in the hearing device before processed signals are presented to the user wearing the hearing device.

FIG. 5 shows a hearing device according to an embodiment of the present disclosure using a trained (personalized to a particular user) neural network to control processing of signals representing sound in the hearing device before processed signals are presented to the user wearing the hearing device. The hearing device (HD) comprises an input-detector-decision block as illustrated in FIG. 1. The output RES of the decision unit (Post-Pro) is fed to a processor (PRO) of the hearing device. The processor (PRO) receives the electric input signals (IN1, IN2) from the microphones (M1, M2) and processes the signals in dependence of the output RES of the decision unit (Post-Pro). The output RES of the decision unit (Post-Pro) may e.g. represent an own voice detection control signal, a particular wake-word or (command) key word of a voice control interface, etc. Based thereon, the processor (PRO) provides a processed output (OUT) which is fed to an output transducer, here a loudspeaker (SPK), for presentation to the user of the hearing device. Thereby a hearing device comprising a voice control interface (or simply a wake-word detector) may e.g. be implemented. The Processor (PRO) may as well contain a NN-based detector (e.g. an OV detector). The output of an OV detector may be an input feature for other detectors such as a wake-word detector. In the embodiment of FIG. 5, the output RES of the decision unit (Post-Pro) is fed to a processor (PRO) of the hearing device. It may alternatively or additionally be fed to another functional part of the hearing device, e.g. to a voice interface for controlling functionality of the hearing device based on identification of a number of command words. The output of the decision unit may e.g. be a command word or sentence or a wake-word or sentence for activating the voice control interface. The output RES of the decision unit (Post-Pro) may alternatively or additionally be fed to a transmitter (or transceiver) for transmission to another device for further processing there, e.g. to activate a personal assistant (e.g. of a smartphone or the like). The transceiver may e.g. receive a response from another device, e.g. from the personal assistant. The response can e.g. be used to control the hearing device, or it can be played for the user via the output transducer (SPK) of the hearing device.

Figure 6:
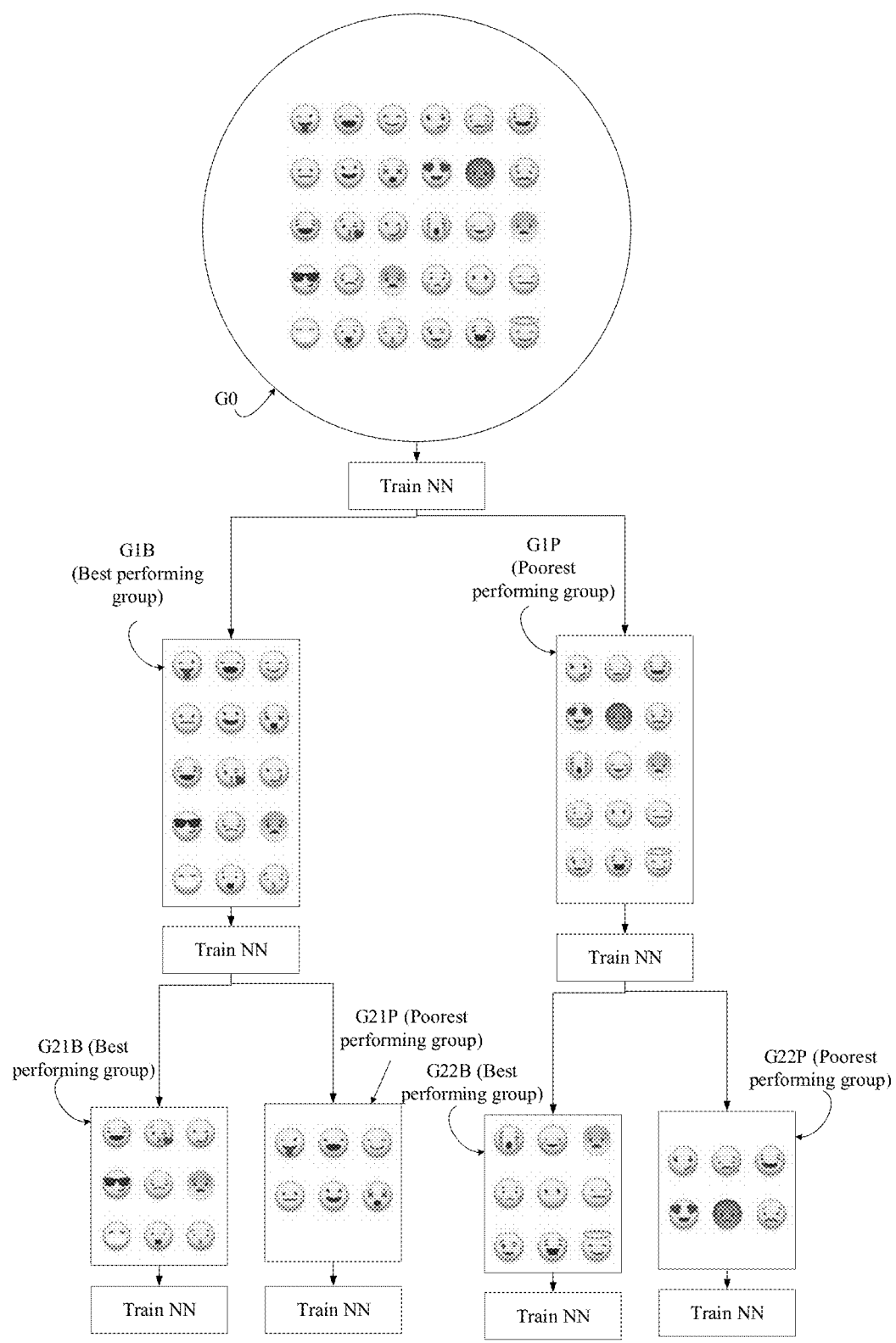
FIG. 6 shows an exemplary procedure for subdividing a basic group of persons for providing training data for training a neural network into a multitude of subgroups of persons for training a multitude of neural networks to thereby provide a multitude of optimized neural networks, each representing different properties of the test persons.

FIG. 6 shows an exemplary procedure for subdividing a basic group of persons for providing training data for training a neural network into a multitude of subgroups of persons for training a multitude of neural networks to thereby provide a multitude of optimized neural networks, each representing different properties of the test persons. FIG. 6 illustrates how the training of the neural networks may be divided into different networks each trained on subsets of the dataset. Thereby a number of groups of persons having similar speech/voice characteristics can be provided. And consequently, based thereon a corresponding number of trained networks ($NN_1, \ldots NN_K$ can be generated.

Groups of candidates could be created by an iterative process. Starting with training a single NN, the persons who have the poorest NN performance are grouped, and another NN is trained for those people. (as well as the first NN is trained for the first group of people). Alternatively grouping could be based on Age, Gender, pitch. or other ways of measuring similarity of differences between different talkers. Thereby it is likely that a new individual (which is not part of the training data) will perform well on at least one of the trained neural networks. One advantage is that the size of the neural network can be kept small as the network do not have to generalize to all people.

FIG. 7A shows an embodiment of a keyword detector implemented as a neural network according to the present disclosure. FIG. 7B shows the context of an electric input signal comprising audio used to generate an input vector for the neural network of FIG. 7A.

FIG. 7A shows an embodiment of a keyword spotting detector implemented as a neural network according to the present disclosure. FIG. 7A schematically illustrates a deep neural network(DNN) for determining a probability of the occurrence p(KWq,l) of a specific keyword KWq, q=1, . . . , Q, at a given point in time (l') from an input vector comprising a number L of time frames X(k,l), l=l'−(L−1), . . . , l', of an electric input signal or characteristic features thereof (=feature vector, FV) in a time-frequency representation (k,l), where k is a frequency index and l is a time (frame) index. The electric input signal or characteristic features (e.g. cepstral coefficients, or spectral characteristics, etc.) thereof at a current time l=l', termed 'Feature vector FV' in FIG. 1, 2, is denoted X(k,l') in FIG. 7A, 7B. The L (last) time frames of the input signal (X(k,l)), constituting the exemplary input vector to the neural network at a given point in time l=l', are denoted Z(k,l') in FIG. 7A, 7B. This 'context' included in each input vector is illustrated in FIG. 7B. The keyword spotting detector may be configured to provide that only the parameters of the last q layers are different (between the NN candidates).

A present time frame (l') and a number L−1 of preceding time frames are stacked to a vector and used as input layer in a neural network (together denoted Z(k,l'), cf. also hatched time-frequency units denoted 'Context' in FIG. 7B. Each time frame X(k,l') comprises K (e.g. K=16 or K=24, or K=64 or K=128) values of an electric input signal (or features extracted therefrom). The signal may be represented by its magnitude |X(k,l')| (e.g. by ignoring its phase φ), cf. FIG. 7B. Alternatively, the input vector may comprise time samples of the input signal (time domain) covering an appropriate time segment. An appropriate number of time frames is related to the correlation inherent in speech. In an embodiment, the number L−1 of previous time frames, which are considered together with the present one l=l', may e.g. correspond to a time segment of duration of more than 20 ms, e.g. more than 50 ms, such as more than 100 ms, e.g. around 500 ms. In an embodiment, the number of time frames considered (=L) are larger than or equal to 4, e.g. larger than or equal to 10, such as larger than or equal to 24, e.g. in the range from 10-100. The width of the neural network is in the present application equal to K·L, which for K=64 and L=10 amounts to $N_{L1}$=640 nodes of the input layer L1 (representing a time segment of the audio input signal of 32 ms (for a sampling frequency of 20 kHz and a number of samples per frame of 64 and assuming non-overlapping time frames)). The number of nodes ($N_{L2}$, . . . , $N_{LN}$) in subsequent layers (L2, . . . , LN) may be larger or smaller than the number of nodes $N_{L1}$ of the input layer L1, and in general adapted to the application (in view of the available number of input data sets and the number of parameters to be estimated by the neural network). For the present application in a portable hearing device with limited power and space, the subsequent layers ($N_{L2}$, . . . , $N_{LN}$) may preferably comprise less (such as significantly less) nodes, e.g. of the order of the number of output nodes. In the present case the number of nodes $N_{LN}$ in the output layer LN is Q (e.g. ≤20, or 10 or less) in that it comprises Q values of the probability estimator p(KWq,l') (q=1, . . . , Q), one value for each of Q keywords of the voice interface. The output layer may optionally comprise Q+1 or Q+2 nodes by inclusion of one value for detection of the user's own voice and/or for detection of a 'filler' (no keyword). In an embodiment, the neural network is fed with a new input feature vector every time a new timeframe of the input signal is provided by a filter bank of the hearing device (i.e. in such case there will be a certain overlap of time frames from one input vector to the next). To reduce computational complexity (and power consumption), the frequency of executing the neural network may, however, be lower than once every timeframe, e.g. once every $10^{th}$ time frame or lower than once every $20^{th}$ time frame (e.g. less than once every 20 ms or less than once every 40 ms). Preferably, however, the context (the input feature vector) fed to the neural network at a given point in time overlaps (in time) with the previous context. In an embodiment, the number of timeframes AL between each new execution of the neural network is smaller than the number of time frames L in the input feature vector (ΔL<L, e.g. ΔL/L≤0.5) to ensure context overlap. As an alternative to stacking the time frames, a recurrent network structure may be utilized (e.g. an LSTM or a GRU network). Hereby the input layer may be significantly smaller.

FIG. 7A is intended to illustrate a general multi-layer neural network of any type, e.g. deep neural network, here embodied in a standard feed forward neural network. The depth of the neural network (the number of layers), denoted N in FIG. 7A, may be any number and typically adapted to the application in question (e.g. limited by a size and/or power supply capacity of the device in question, e.g. a portable device, such as a hearing aid). In an embodiment, the number of layers in the neural network is larger than or equal to two or three. In an embodiment, the number of layers in the neural network is smaller than or equal to ten, e.g. in the range from 2 to 8 or in the range from 2 to 6.

The nodes of the neural network illustrated in FIG. 7A is intended to implement standard functions of a neural network to multiply the values of branches from preceding nodes to the node in question with weights associated with the respective branches and to add the contributions together to a summed value $Y'_{v,u}$ for node v in layer u. The summed value $Y'_{v,u}$ is subsequently subject to a non-liner function f, providing a resulting value $Z_{u,v}=f(Y'_{v,u})$ for node v in layer u. This value is fed to the next layer (u+1) via the branches connecting node v in layer u with the nodes of layer u+1. In FIG. 7A the summed value $Y'_{v,u}$ for node v in layer u (i.e. before the application of the non-linear (activation) function to provide the resulting value for node v of layer u) is expressed as:

$$Y'_{v,u} = \Sigma_{p=1}^{NL(u-1)} w_{p,v}(u) Z_{p,v}(u-1)$$

where $w_{p,v}(u)$ denotes the weight of node v of layer u to be applied to inputs from node p in layer L(u−1), and $Z_{p,v}(u-1)$ is the signal value of the $p^{th}$ node in layer u−1. The same activation function f is used for all nodes (this may not necessarily be the case, though). The non-linear function may be parameterized, and one or more parameters of the non-linear function may be included in the optimization of node parameters. Further, a bias parameter $b_{p,v}$ may be associated with each node each node and participate in the optimization of node parameters. An exemplary non-linear activation function Z=f(Y) is schematically illustrated in the insert in FIG. 7A. Typical functions used in neural networks are the Rectified Linear Unit (ReLu), the hyperbolic tangent function (tanh), the sigmoid, or softmax function. Other functions may be used, though. And as indicated, the activation function, e.g. the ReLu function, may be parametrized (e.g. to allow different slopes).

Together, the (possibly parameterized) activation function $f$ and the weights w and bias parameters b of the different layers of the neural network constitute the parameters of the neural network. They represent the parameters that (together) are optimized in respective iterative procedures for the neural networks of the present disclosure. The same activation function $f$ may be used for all nodes (so in that case, the 'parameters of the neural network' are constituted by the weights and bias parameters of the layers). In an embodiment, no activation function $f$ is used at least for some of the nodes of the neural network.

Typically, the candidate neural networks according to the present disclosure are optimized (trained) in an offline procedure, e.g. using a model of the head and torso of a human being (e.g. Head and Torso Simulator (HATS) 4128C from Brüel & Kjær Sound & Vibration Measurement A/S), where the HATS-model is 'equipped' with a hearing device (or a pair of hearing devices) of the same type (style) as intended for the user. The hearing device is configured to pick up the (acoustically propagated) training data, while located at the ears of the model (as intended during normal use of the hearing device by the user). A number of different classes of test persons are defined (e.g. according to the scheme of FIG. 6) or based on parameters of the test persons, e.g. age, gender, weight/height ratio, profession, 'type', etc. $N_x$ different neural networks are optimized based on training data involving the ($N_x$) different individual groups of persons. Ideally, training data that are relevant for the user's normal behaviour and experience of acoustic environments, should be used.

In the case of training different networks based on personalized acoustical properties, it may be better to record the acoustical properties from different people. Personal acoustical properties may e.g. be obtained as described in [Moore et al., 2019].

For a keyword detector application, own voice detection may advantageously be used to qualify where in the user's sentence to look for a keyword. Hence an own voice detection signal may be used as an input to the pre-processor (Pre-PRO in FIG. 1, 2, 5) to qualify the electric input signals (IN1, IN2) from the microphone(s) (M1, M2). Alternatively, the own voice detection signal may form part of the feature vector used as input to the neural network. This may be advantageous, because it is unlikely that a user intends to trigger a keyword (e.g. a wake-word or a command word) in the middle of a sentence. The use of an own voice presence indicator can allow keywords only to be detected in the beginning of a sentence. For example, a rule may be imposed that a keyword can only be (validly) detected if own voice has NOT been detected during the last 0.5 seconds or the last second or last 2 seconds (but is detected 'now').

In FIG. 7A, the neural network is exemplified as a feed-forward network, but other neural network configurations may be used, e.g. a convolutional networks (CNN), recurrent networks, or combinations thereof.

Figure 8:
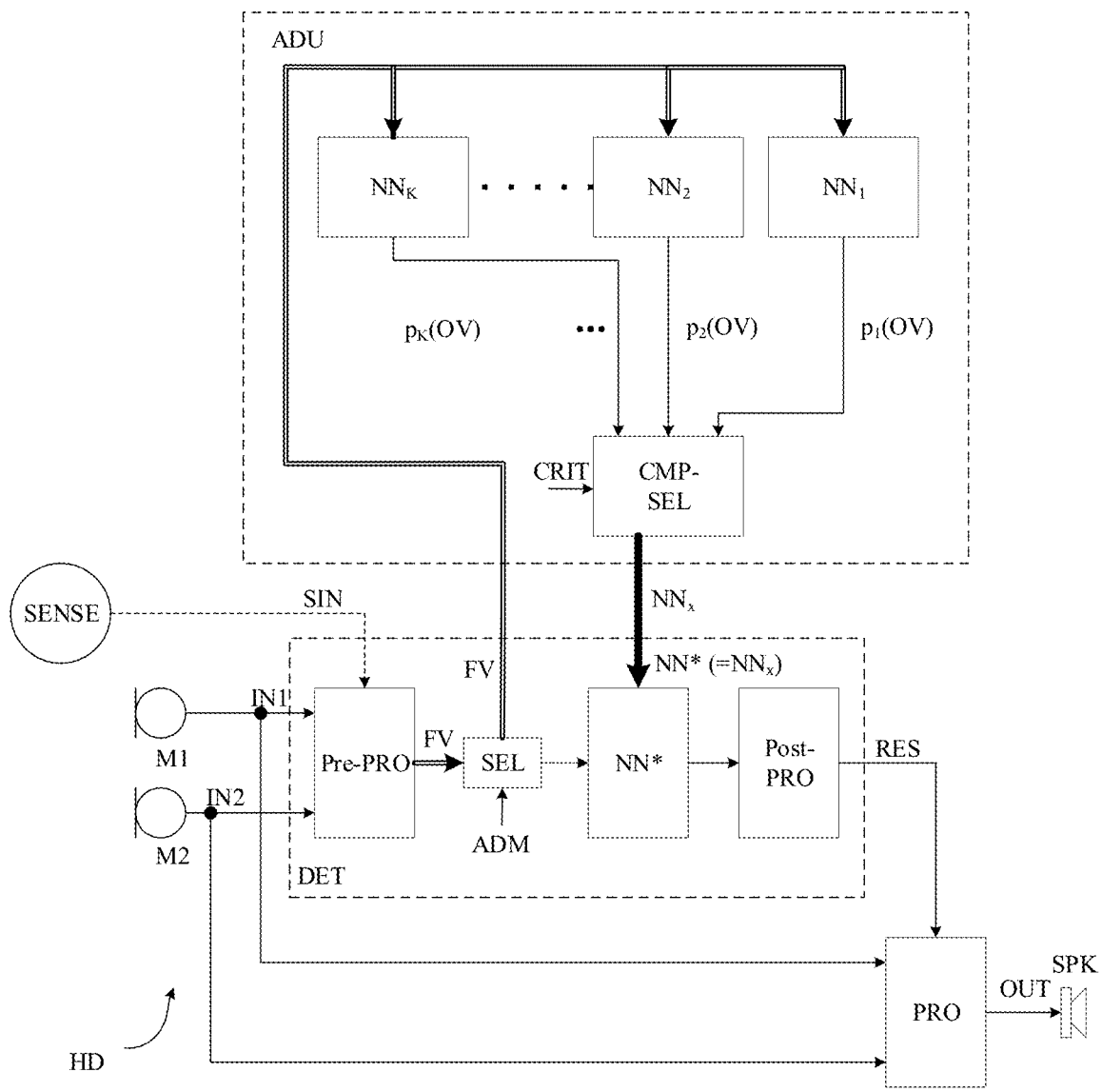
FIG. 8 shows an embodiment of a hearing device according to the present disclosure comprising an adaptation unit configured to allow the selection of an optimized set of parameters for a neural network among a multitude of sets of optimized parameters without using an external device.

FIG. 8 shows an embodiment of a hearing device according to the present disclosure comprising an adaptation unit configured to allow the selection of an optimized set of parameters for a neural network among a multitude of sets of optimized parameters without using an external device. FIG. 8 illustrates a self-contained hearing device (HD), e.g. a hearing aid, comprising an optimized neural network (NN*), e.g. for implementing a detector (DET) for influencing processing (cf. control signal RES to signal processor PRO) of the hearing device, according to the present disclosure. It may implement the same functionality as illustrated in and described in connection with FIG. 2, while dispensing with the need for an external device (ExD in FIG. 2) for the neural network node parameter optimization procedure (and thus the need for a wireless link (WLNK in FIG. 2) to such external device). The optimized candidate neural networks ($NN_1$, $NN_2$, . . . , $NN_K$) and the evaluation unit (compare and select CMP-SEL) are included in the hearing device (cf. adaptation unit, ADU). In the embodiment of FIG. 8, two microphones (M1, M2) are shown, each providing an electric input signal representative of sound in the environment. Other numbers of input transducers, e.g. microphones, may be used, e.g. one, or three or more. Input transducers from auxiliary devices such as a hearing device mounted at the opposite ear (or from any other body worn microphone) may as well provide input features to the neural network. A beamformer may be included in the pre-processor (Pre-PRO) to allow a directional signal based on electric input signals (IN1, IN2) from two or more microphones to be generated. The directional signal may e.g. be or comprise an estimate of the user's own voice (e.g. generated by an own voice beamformer directed towards the mouth of the user). The beamformed signal (or characteristic features thereof) may be the signal that is fed to the neural network (cf. feature vector FV) for implementing a detector, e.g. an own voice detector or a keyword detector. The optional sensor (SENSE) providing sensor control signal SIN to the pre-processor (Pre-PRO) may or may not form part of the hearing device (HD). The sensor may e.g. be a movement sensor, e.g. comprising an acceleration or gyroscope sensor. Other sensors may e.g. be or comprise a magnetometer, an Electroencephalography (EEG) sensor, a Magnetoencephalography (MEG) sensor, a heart rate detector, a photoplethysmogram (PPG) sensor, etc. The electric input signals (IN1, IN2) are fed to the processor (PRO). The processor (PRO) may be configured to apply a frequency and/or level dependent gain to the electric input signals (or to a processed version thereof, e.g. a spatially filtered (beamformed) version thereof). The processor (PRO) provides a processed output signal (OUT) that is fed to an output transducer, here a loudspeaker (SPK) for presentation to a user of the hearing device.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Accordingly, the scope should be judged in terms of the claims that follow.

REFERENCES

[Moore et al., 2019] Moore, A. H., de Haan, J. M., Pedersen, M. S., Naylor, P. A., Brookes, M., & Jensen, J. (2019). Personalized signal-independent beamforming for binaural hearing aids. The Journal of the Acoustical Society of America, 145(5), 2971-2981

The invention claimed is:

1. A hearing device configured to be located at or in an ear, or to be fully or partially implanted in the head, of a user, the hearing device comprising:
   an input transducer comprising at least one microphone for providing at least one electric input signal representative of sound in the environment of the hearing device,
   a pre-processor for processing said at least one electric input signal and providing a multitude of feature vectors, each being representative of a time segment of said at least one electric input signal,
   a neural network processor adapted to implement a neural network for implementing a detector, or a part thereof, configured to provide an output indicative of a characteristic property of the at least one electric input signal, the neural network comprising an input layer and an output layer and a number of hidden layers, each layer comprising a number of nodes, each node being defined by a number of node parameters, the neural network being configured to receive said multitude of feature vectors as input vectors and to provide corresponding output vectors representative of said output of said detector, or a part thereof, in dependence of said input vectors,
   a post-processor configured to receive said output vectors, and wherein said post-processor is configured to process said output vectors and to provide a resulting signal,
   a transceiver comprising a transmitter and a receiver for establishing a communication link to another part or device or server, said communication link allowing transmission and reception of data to and from, respectively, said another part or device or server, at least in a particular adaptation-mode of operation,
   a selector for, in said particular adaptation-mode of operation, routing said feature vectors to said transmitter for transmission to said another part or device or server and,
   in a normal mode of operation, to route said feature vectors to said neural network processor for use as inputs to said neural network,
   wherein the hearing device is configured to, in said particular adaptation-mode of operation, receive optimized node parameters from said another part or device or server, and to apply said optimized node parameters to said nodes of the neural network to thereby implement an optimized neural network in the neural network processor,
   wherein the optimized node parameters have been selected among a multitude of sets of node parameters for respective candidate neural networks according to a predefined criterion in dependence of said feature vectors, and
   wherein a user is prompted to speak one or more words forming the basis for at least some of said multitude of vectors, and
   said predefined criterion for selecting said optimized node parameters is based on a comparison of output vectors, which are outputted from said candidate neural networks in response to said one or more prompted words spoken by the user.

2. A hearing device according to claim 1 comprising a sensor for sensing a property of the user or of an environment of the hearing device and for providing a sensor signal representative of a current value of said property of the environment, wherein said sensor signal is an input to the pre-processor.

3. A hearing device according to claim 2 wherein said pre-processor is configured to process said at least one electric input signal and said sensor signal to provide said feature vectors.

4. A hearing device according to claim 2 wherein the time segment of said at least one electric input signal and optionally corresponding values of said sensor signal covered by a given feature vector, which are used as input to the input layer of the neural network, comprises at least one time frame of the at least one electric input signal.

5. A hearing device according to claim 1 comprising an output transducer for presenting said processed output signal to the user as stimuli perceivable as sound to the user.

6. A hearing device according to claim 1 comprising an analysis filter bank for converting a time domain input signal to a number of frequency sub-band signals providing the input signal in a time-frequency representation (k, l), where k and/are frequency and time indices, respectively.

7. A hearing device according to claim 1 wherein the pre-processor is configured to extract characteristics of the at least one electric input signal and/or of the sensor signal.

8. A hearing device according to claim 1 wherein said detector or a part thereof implemented by the neural network is or comprises an own voice detector and/or a key word detector.

9. A hearing device according to claim 1 being constituted by or comprising a hearing aid, a headset, an earphone, an ear protection device or a combination thereof.

10. A hearing device according to claim 1 wherein said predefined criterion relates to minimizing a cost function regarding said output vectors.

11. A hearing device according to claim 1 wherein said predefined criterion is based on the performance of the neural network in terms of true positives, false positives, true rejections and false rejections of said output vectors, when said multitude of feature vectors are extracted from time segment of said at least one electric input signal having known properties.

12. A hearing device according to claim 1 wherein said multitude of sets of node parameters for respective candidate neural networks are optimized for different classes of persons exhibiting different acoustic properties.

13. Use of a hearing device as claimed in claim 1.

14. A method of selecting optimized parameters for a neural network for use in a portable hearing device, the method comprising
- providing a portable hearing device to be used by a particular user; the hearing device comprising a neural network processor adapted to implement a neural network comprising an input layer and an output layer and a number of hidden layers, each layer comprising a number of nodes, each node being defined by a number of node parameters and a non-linear function, the neural network being configured to receive an input vector and to provide an output vector as a specific non-linear function of the input vector,
- mounting the hearing device at or on the user;
- providing at least one electric input signal representing sound in the environment of the user wearing the hearing device;
- processing said at least one electric input signal and providing a multitude of feature vectors, each being representative of a time segment of said at least one electric input signal,
- providing a multitude of pre-trained candidate neural networks, where each pre-trained network is considered a candidate for the user, and wherein each pre-trained neural network has been trained on fully or partially different training data;
- receiving said feature vector and providing them as input vectors to said multitude of pre-trained candidate neural networks;
- determining by said multitude of pre-trained candidate neural networks respective output vectors corresponding to said feature vectors;
- comparing said output vectors and selecting one of the multitude of candidate neural networks as the optimized neural network for the hearing device according to a predefined criterion regarding said output vectors;
- transmitting node parameters for the selected one of the multitude of candidate neural networks to the neural network processor of the hearing device, and
- receiving said node parameters in said neural network processor and applying them to said neural network, and
- prompting the user to speak one or more predetermined words forming the basis for at least some of said multitude of feature vectors, and
- wherein said predefined criterion for selecting said optimized neural network is based on a comparison of output vectors, which are outputted from said candidate neural networks in response to said one or more predetermined words spoken by the user.

15. A method according to claim 14 wherein each of the candidate neural networks have been trained on training data from different classes of persons, exhibiting different acoustic properties.

16. A method according to claim 14 wherein a signal representative of a current value of a property of the user or the environment of the user is provided in the hearing device and processed together with the at least one electric input signal to provide said feature vectors.

17. A method according to claim 14 comprising providing several sets of a multitude of pre-trained candidate neural networks, each candidate neural network for each set having the same structure as the neural network of the hearing device, where each pre-trained network is considered a candidate for the user, and wherein each pre-trained neural network has been trained on fully or partially different training data, and wherein each set of pre-trained candidate neural networks is aimed at implementing a different detector.

18. A non-transitory computer readable medium on which is stored a computer program comprising instructions which, when executed by a computer, cause the computer to carry out the method of claim 14.

* * * * *